US006890031B2

(12) United States Patent
Rhein

(10) Patent No.: US 6,890,031 B2
(45) Date of Patent: May 10, 2005

(54) ADJUSTABLE CHILD SUPPORT STRUCTURE

(75) Inventor: John F. Rhein, Hamburg, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/270,072

(22) Filed: Oct. 15, 2002

(65) Prior Publication Data

US 2004/0070247 A1 Apr. 15, 2004

(51) Int. Cl.$^7$ .......................... B60N 2/28; A47D 15/00
(52) U.S. Cl. .................................................. 297/284.9
(58) Field of Search ........................ 297/284.9, 284.1, 297/250.1, 219.12

(56) References Cited

U.S. PATENT DOCUMENTS

| | | | |
|---|---|---|---|
| 1,538,538 A | | 5/1925 | Wood |
| 2,619,157 A | | 11/1952 | Guyton et al. |
| 2,707,988 A | | 5/1955 | Shaub et al. |
| 3,608,960 A | | 9/1971 | Sherman |
| 3,962,738 A | | 6/1976 | Menditto |
| 4,241,458 A | | 12/1980 | Lesesne |
| 4,500,136 A | | 2/1985 | Murphy et al. |
| 4,537,444 A | * | 8/1985 | Maruyama et al. ...... 297/284.9 |
| 4,603,902 A | | 8/1986 | Maloney |
| 4,636,000 A | * | 1/1987 | Nishino .................... 297/284.9 |
| 4,653,805 A | | 3/1987 | Maloney |
| 4,674,800 A | | 6/1987 | Ensign |
| 4,696,514 A | | 9/1987 | Maloney |
| 4,773,702 A | | 9/1988 | Takahashi et al. |
| 4,793,652 A | | 12/1988 | Hannah et al. |
| 4,804,221 A | | 2/1989 | Saiki |
| 4,823,405 A | | 4/1989 | Porter |
| D304,256 S | | 10/1989 | McEntee |
| 4,913,491 A | | 4/1990 | Mizuno et al. |
| 4,938,529 A | * | 7/1990 | Fourrey .................... 297/284.9 |
| 4,993,090 A | | 2/1991 | Ranalli |
| 5,022,709 A | | 6/1991 | Marchino |
| 5,098,157 A | | 3/1992 | Surot |
| D329,248 S | | 9/1992 | Brown |
| 5,243,724 A | | 9/1993 | Barnes |
| 5,366,277 A | | 11/1994 | Tremblay |
| 5,437,061 A | | 8/1995 | Kenner |
| 5,441,328 A | * | 8/1995 | Snyder .................... 297/284.9 |
| 5,611,095 A | | 3/1997 | Schneider |
| 5,645,317 A | | 7/1997 | Onishi et al. |
| 5,681,083 A | | 10/1997 | Nelson et al. |
| 5,681,084 A | | 10/1997 | Yoneda |
| 5,781,946 A | | 7/1998 | McEntire et al. |
| 5,810,445 A | | 9/1998 | Surot |
| 5,842,739 A | | 12/1998 | Noble |
| 5,857,743 A | * | 1/1999 | Ligon et al. ............. 297/284.9 |
| 5,860,696 A | | 1/1999 | Opsvik et al. |
| 5,897,164 A | | 4/1999 | Kagan et al. |
| 5,913,569 A | | 6/1999 | Klingler |
| 5,916,089 A | | 6/1999 | Ive |
| 5,918,933 A | | 7/1999 | Hutchinson et al. |
| 5,950,261 A | | 9/1999 | Hay et al. |
| 5,956,766 A | | 9/1999 | Benway |
| 5,956,767 A | | 9/1999 | Imm |
| 5,988,742 A | | 11/1999 | Stevens |
| 6,007,151 A | | 12/1999 | Benson |
| 6,012,189 A | | 1/2000 | Dudley |
| 6,045,183 A | | 4/2000 | Weber |
| 6,053,064 A | | 4/2000 | Gowing et al. |
| 6,055,686 A | | 5/2000 | Knight |
| 6,068,336 A | * | 5/2000 | Schonauer ............... 297/284.9 |

(Continued)

*Primary Examiner*—Peter R. Brown
(74) *Attorney, Agent, or Firm*—Cooley Godward LLP

(57) ABSTRACT

An adjustable child support structure having a seat back including side sections that fold inward to provide lateral support for an infant or remain flat to provide a wider seat back for a toddler. The structure also includes an adjuster having a user control portion and a side wing actuator portion for remotely adjusting the seat back through a range of motion between the first, wide position and the second, narrow position.

18 Claims, 11 Drawing Sheets

U.S. PATENT DOCUMENTS

| | | |
|---|---|---|
| D430,079 S | 8/2000 | Catron-Batts |
| 6,105,168 A | 8/2000 | Hazen |
| D431,377 S | 10/2000 | Buggs |
| 6,139,102 A | 10/2000 | von Möller |
| 6,145,932 A | 11/2000 | Hamel-Nyhus et al. |
| 6,257,664 B1 | 7/2001 | Chew et al. |
| 6,460,933 B1 | 10/2002 | Bors et al. |
| 6,471,222 B1 | 10/2002 | Hsia |
| 6,682,143 B2 | 1/2004 | Amirault et al. |
| 6,752,457 B2 | 6/2004 | Gold et al. |
| 2004/0084941 A1 | 5/2004 | Asbach et al. |

* cited by examiner

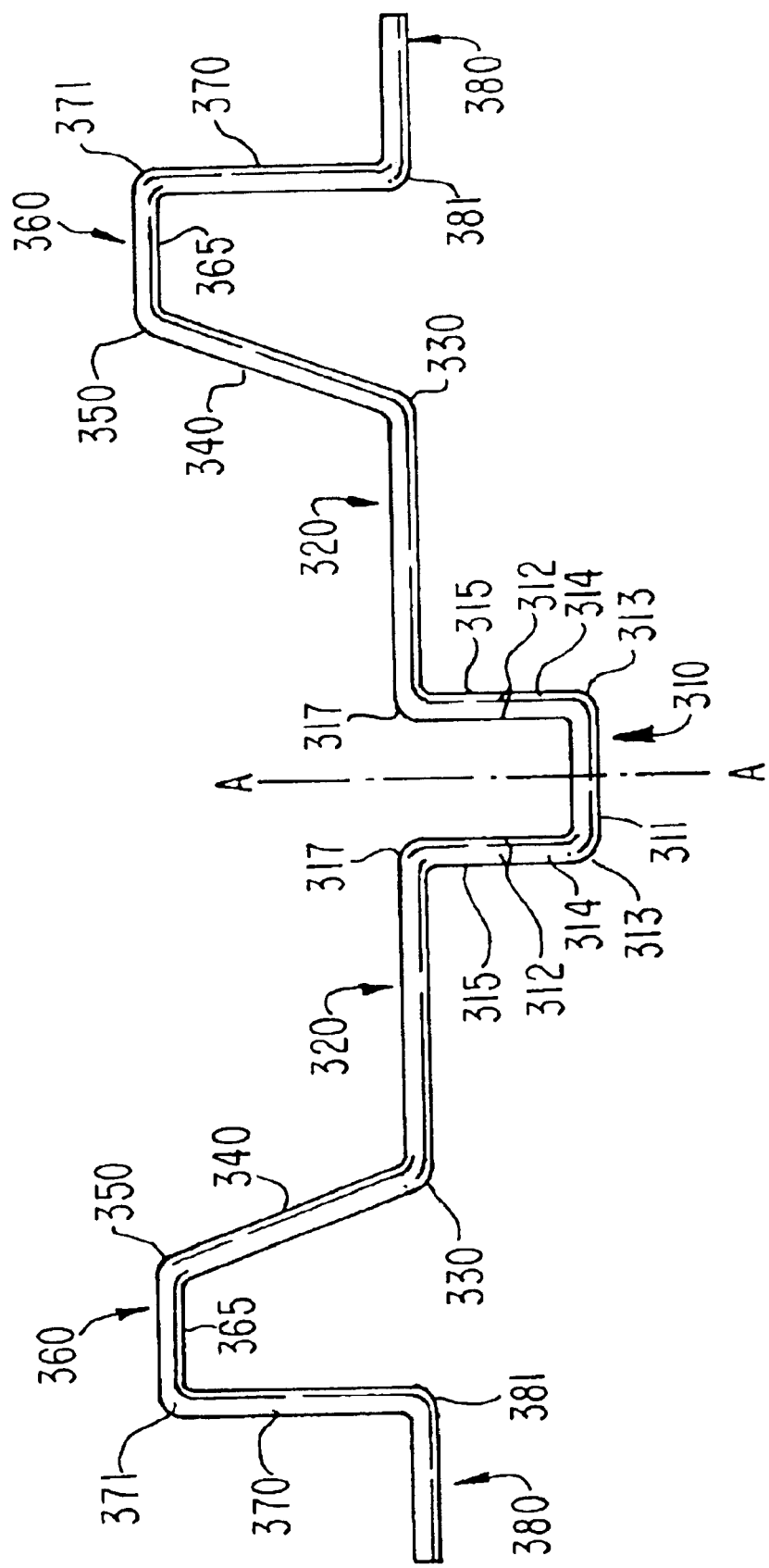

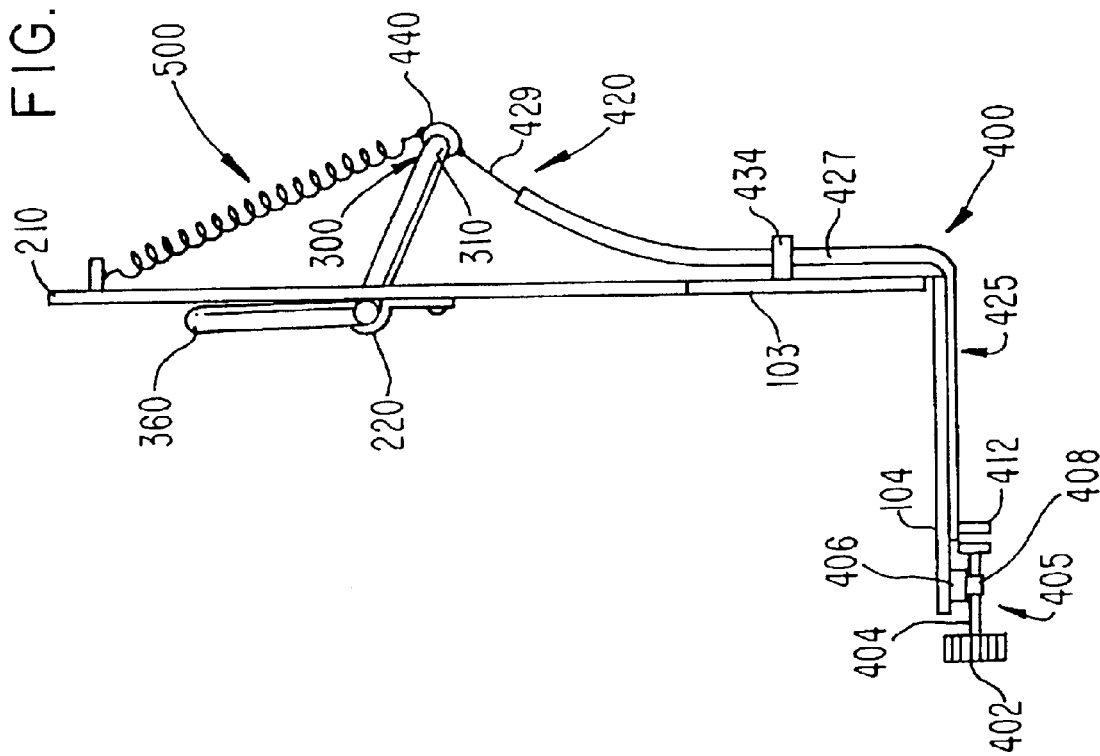
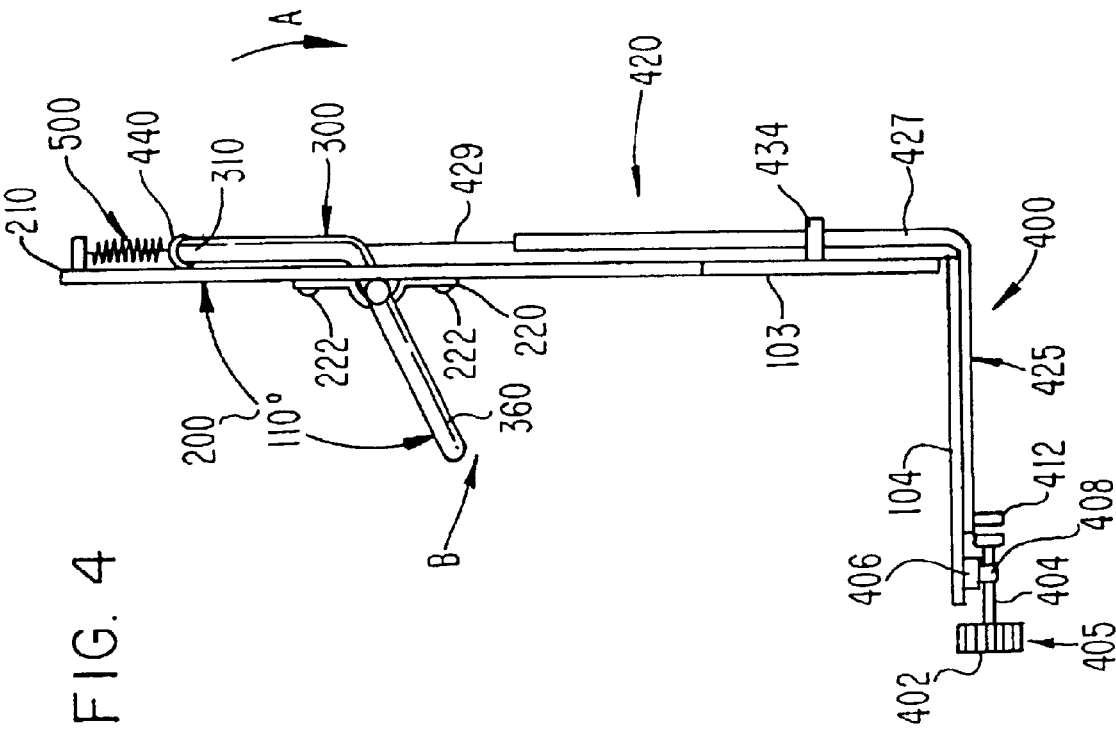

ADJUSTABLE CHILD SUPPORT STRUCTURE

BACKGROUND

1. Field of the Invention

The present invention relates generally to an adjustable child support structure, and more particularly, to an adjustable seat back with side sections that fold inwardly to provide lateral support for a child or remain flat to provide a wider seat back for the child.

2. Discussion of the Related Art

Conventional child support structures, such as strollers, high chairs, and swings, generally include a seat having a base and back portion. The base and back portions of the seat usually include unisectional, nonadjustable cushions. The cushions are usually made generally planar and wide enough to accommodate a toddler. The width and planar aspects of these unisectional cushions can present problems with the use of the seat by younger infants. By making the cushion wide enough to accommodate the larger child or toddler, the cushions are often much wider than the children who are first beginning to use the stroller, such as a young baby or infant. In addition, infants often are not developed or coordinated enough to sit up straight in the seat Since the unisectional cushion provides no lateral support, the infant often tilts laterally, slumping sideways in the seat.

Several seat backs have been proposed that provide a method for narrowing the width of the seat back so that the seat back is usable by both infants and toddlers. Such conventional seat backs have generally been difficult to adjust due to cumbersome and complex designs. In addition, they have been difficult to adjust due to inconvenient placement of the adjustment mechanism on the seat back structure. Moreover, conventional seat backs have generally required manual actuation of the adjusting mechanism and have generally only been adjustable between the wide, or upright, and the narrow, or reclined, positions.

For example, in one conventional seat back, the side supports are individually operated so that the operator must adjust and release each side support separately. In another example, the seat back is adjusted by manually operating a single lever disposed on the seat that adjusts the side sections into an extended position or a retracted position. Another design requires insertion and removal of a number of individual pieces.

A need exists for a simple mechanism that can be used to adjust a seat back through a range of motion between a narrow position and a wide position. A need also exists for a mechanism that does not require direct manual manipulation of the actuator so that the seat back actuator can be conveniently and remotely moved into the desired position.

SUMMARY OF THE INVENTION

The present invention solves the problems with, and overcomes the disadvantages of, conventional adjustable child support structures. In particular, the present invention provides a seat back having a back support section and two side wing sections. The side wing sections are adjustable with respect to the back section through a range of motion between a first position to provide lateral support for younger children and a second position to provide a sufficiently wide seat back for older children. The present invention also includes an adjuster having a user control portion and a side wing actuator portion for adjusting the seat back through a range of motion between the first position and the second position.

BRIEF DESCRIPTION OF THE DRAWINGS

FIG. 3 is a front view of the actuator of the wing adjustment assembly of FIG. 2.

FIG. 4 is a side view of an embodiment of an adjuster usable with the wing adjustment assembly of FIG. 2 showing the wing adjustment assembly in the extended position.

FIG. 5 is a side view of the adjuster of FIG. 4 showing the wing adjustment assembly in the retracted position.

DETAILED DESCRIPTION

Figure 1:
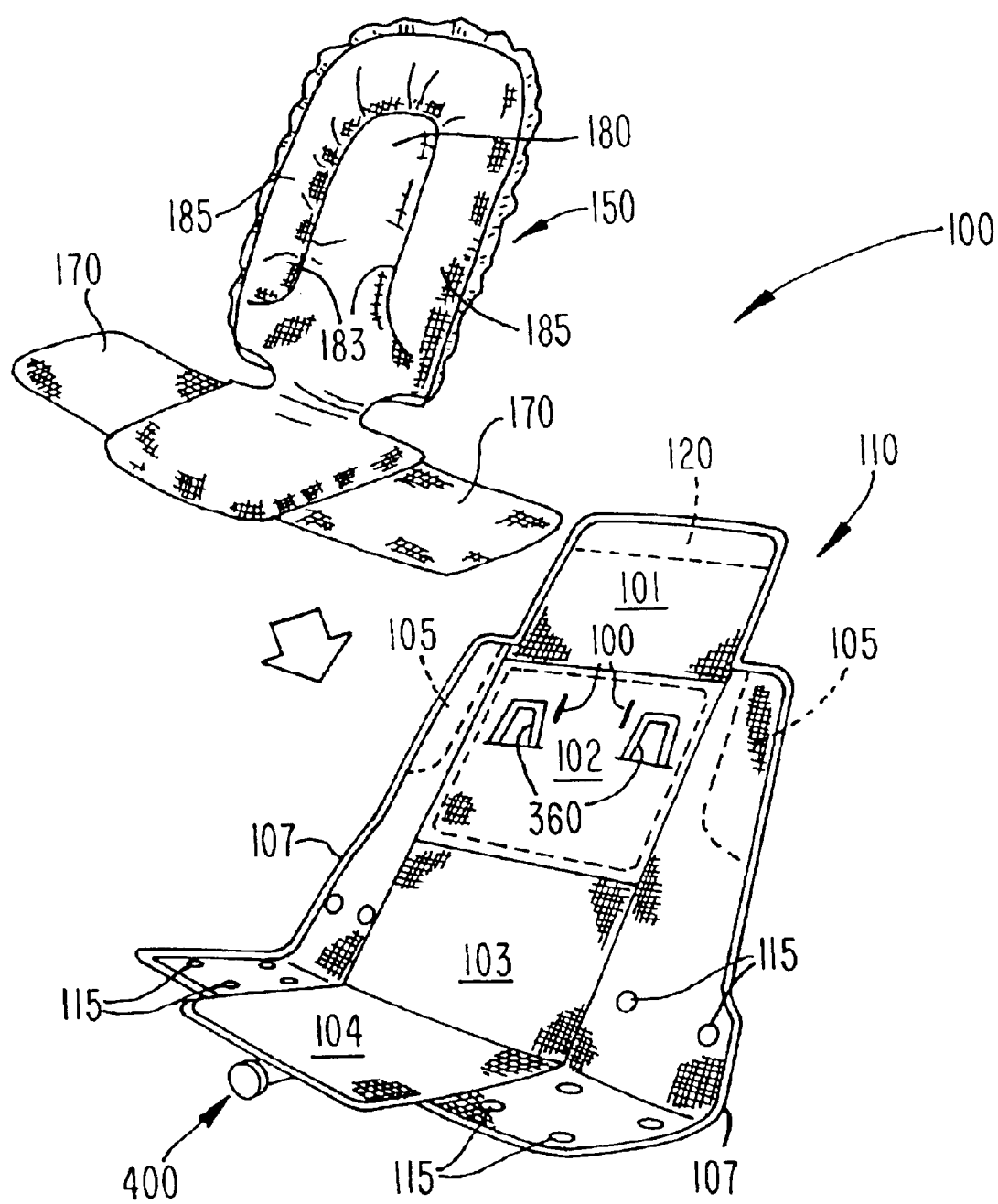
FIG. 1 is an exploded perspective view of an embodiment of a seat liner and a seat pad embodying the principles of the invention.

An adjustable child support structure 100 according to an embodiment of the invention is illustrated in FIG. 1. Support structure 100 includes a seat liner 110 and a seat pad 150. The central body of the seat liner 110 is divided into four sections 101–104, each of which encloses a rigid panel (not shown, but in this embodiment is an injected molded plastic panel, which could alternatively be made of hardboard) that provides rigidity to each section 101–104 of the seat liner 110 and support for the occupant. The liner 110 also includes a pair of upper side pockets 105 that are fitted over seat back side supports (not shown) to hold the seat liner 100 stationary with respect to a support structure, such as a stroller. In addition, lower side sections 107 can be secured to the support structure.

Figure 7:
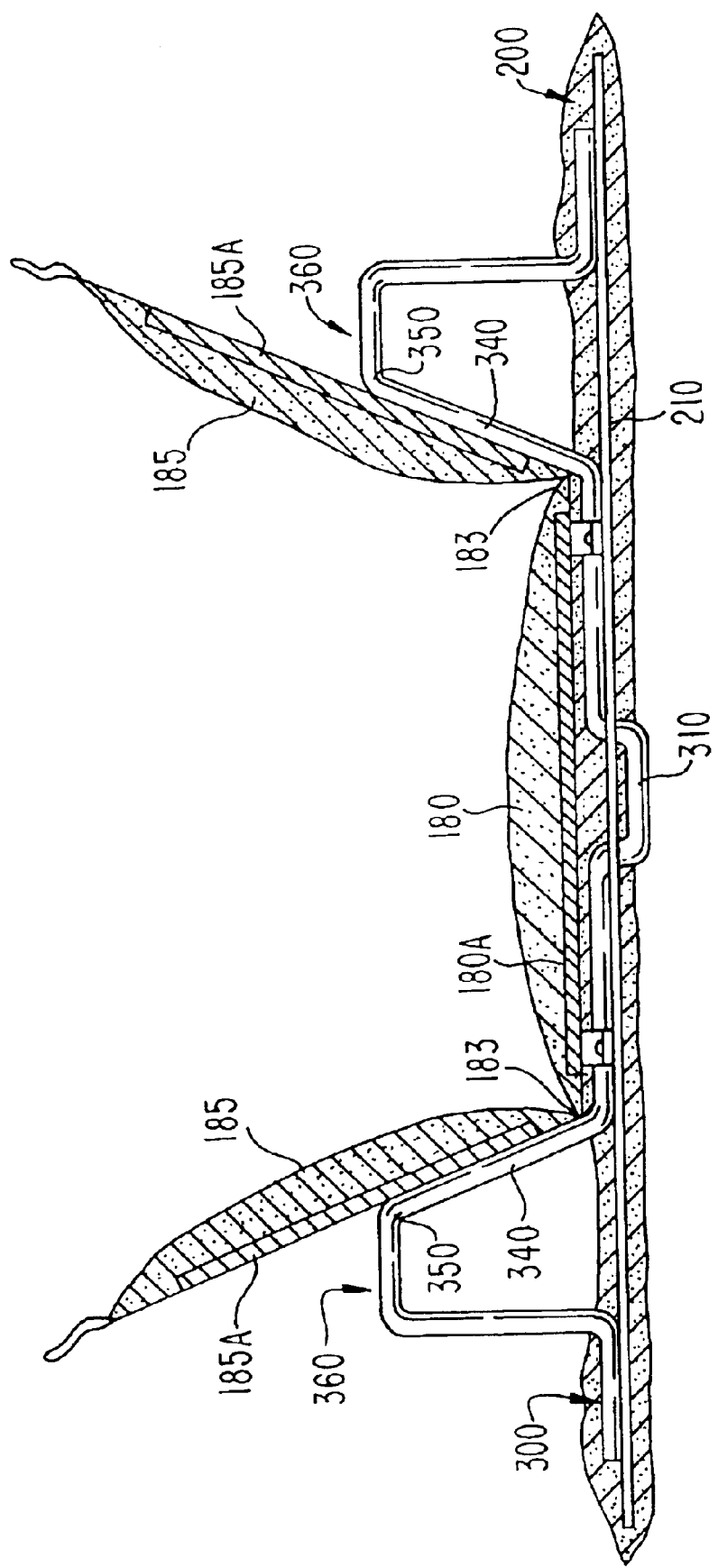
FIG. 7 is a cross-sectional view of the seat liner and seat pad of FIG. 1 in an assembled configuration with the wing adjustment assembly in the extended position.

Seat pad 150, which acts as a removable and washable cushion for the child, is placed over seat liner 110. Pads 170 wrap over the top of lower side sections 107 and are secured in place by a strip hook-and-loop fastener material (not shown). A pair of fastening ties (not shown) are sewn into the back of seat pad 150. These ties are fastened to the liner side of center back section 180 and extend through seat liner apertures 190 to be secured to each other by a strip of hook-and-loop fastener material at the back of the support structure. These ties 140 hold the center back section 180 of the seat pad 150 stationary with respect to seat liner 110. Wing sections 185 extend laterally from center back section 180 and are pivotable about substantially vertical axes at seams 183. Furthermore, inside each wing section 185 (as shown in FIG. 7) is a rigid base panel 185A (such as hardboard or plastic) on the liner side of the wing section to provide support against wing support sections 360. Padding inside the wing sections 185 on the occupant side, between the rigid panel and occupant, allows for a comfortable seat back. The center back section 180 also has a rigid base panel 180A (such as hardboard or plastic) to provide support to the occupant.

Figure 2:
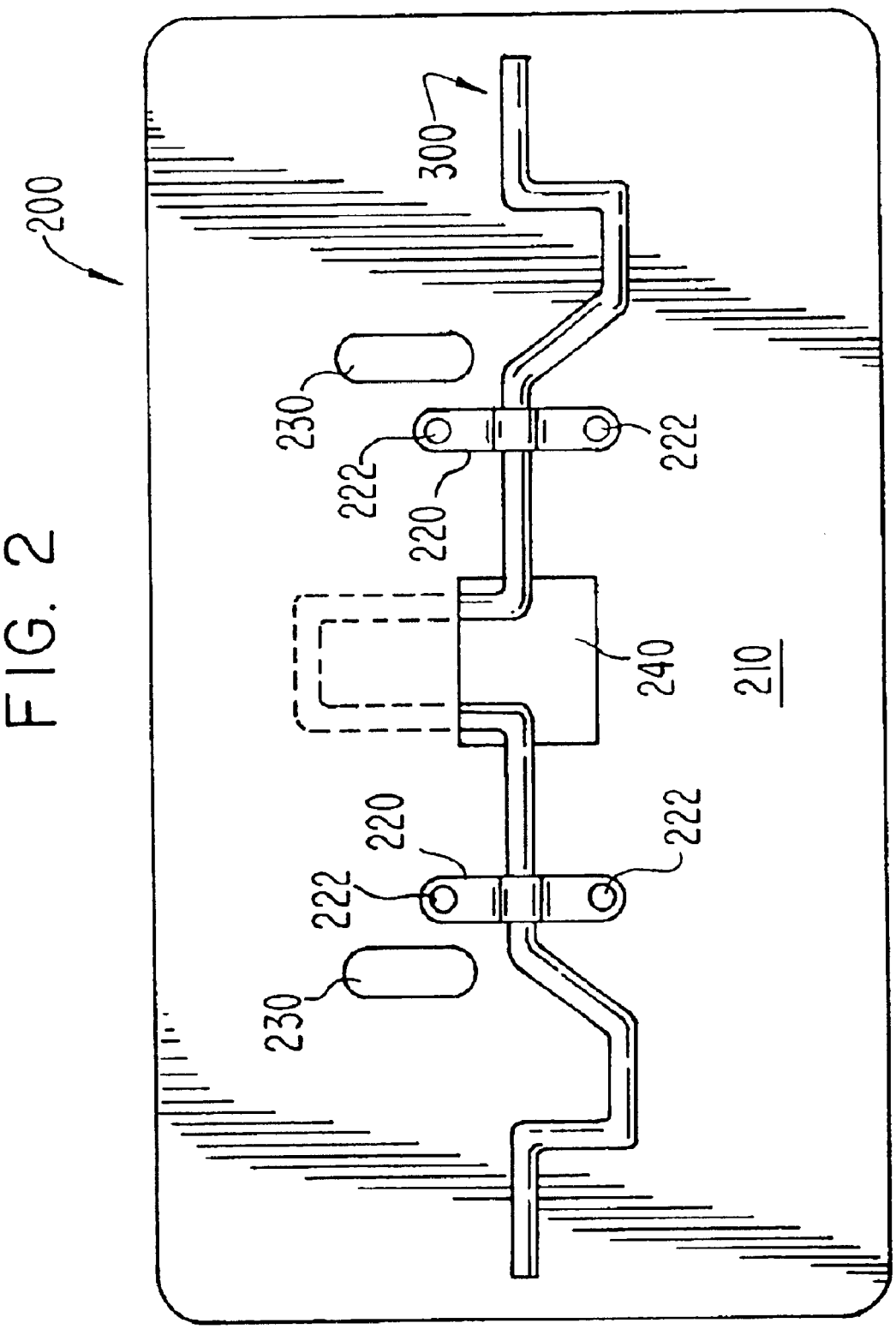
FIG. 2 is a front view of a wing adjustment assembly usable with the seat liner of FIG. 1 embodying the principles of the invention.

As illustrated in FIG. 1, the seat liner 110 includes a seat liner section 102. Seat liner section 102 further includes a wing adjustment assembly 200, illustrated in FIGS. 2–5. As shown in FIG. 2, the wing adjustment assembly 200 includes a wing actuator 300, which in the illustrated embodiment is a wireform made of bent, heavy-gauge, powder-coated steel wire.

As shown in FIG. 3, the wing actuator 300 is symmetric about centerline "A—A." The following description of one side of the actuator 300 applies equally to both sides. Each side of actuator 300 can be divided into four sections: end section 380; wing support section 360; pivot section 320; and half of lever 310. End section 380 is coupled to wing support section 360 at corner 381. Wing support section 360 includes an outside segment 370, which is joined to an end support segment 365 at a corner 371. The end support segment 365 is joined to inside support segment 340 at corner 350. Wing support section 360 is joined to pivot section 320 at corner 330. Pivot section 320 is joined to lever 310 at corner 317. Lever 310 includes a pair of first side segments 315 connected to a pair of second side segments 314 at bends 312. Second side segments 314 are joined to lever end segment 311 at corners 313.

As illustrated in FIGS. 2 and 7, the actuator 300 is mounted on the front side (facing the seat pad) of the base panel 210, with the lever 310 projecting rearwardly through lever aperture 240 of the base panel 210. The actuator 300 is fixed in place on base panel 210 by clips 220. The clips 220 are fastened to base panel 210 by rivets 222 at both ends, but any appropriate fastening method could be used. Clips 220 are fastened tightly enough that friction between the clips 220 and the actuator 300 will prevent undesired and unassisted pivoting of the actuator 300, but also allow for easy adjustment by the operator.

Figure 6:
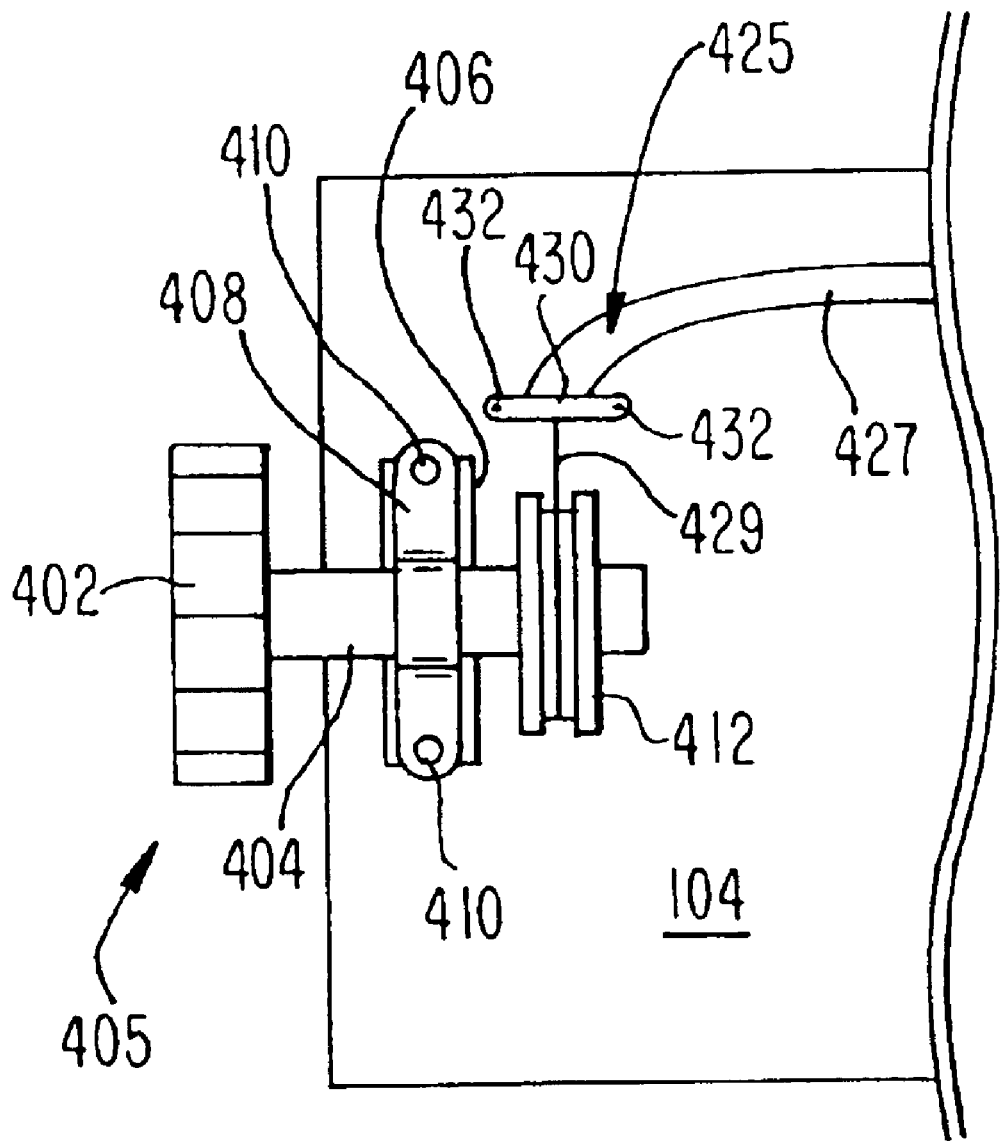
FIG. 6 is a bottom view of the adjuster of FIGS. 4 and 5.

An embodiment of an adjuster according to the invention is illustrated in FIGS. 4–6. FIGS. 4 and 5 also illustrate the operative engagement of the adjuster and actuator 300.

As shown in FIGS. 4 and 5, the actuator 300 is pivotable between a first extended position (as shown in FIG. 4) in which wing support sections 360 project out from the base panel 210 and lever 310 is substantially vertical and adjacent base panel 210 to a second, retracted position (as shown in FIG. 5) in which wing support sections 360 are substantially vertical and adjacent base panel 210 and lever 310 projects away from the base panel 210.

Adjuster or adjustment mechanism 400 includes a user control portion 405 and a wing actuator engaging portion 420. As illustrated, the user control portion 405 includes a handle 402 that is affixed to a rotatable shaft 404. Shaft 404 is rotatably mounted to a lower surface of liner section 104. The shaft is coupled in place on liner section 104 by a clip 408. In the illustrated embodiment, a mounting block or spacer 406 is disposed between clip 408 and the bottom surface of liner 104 in order to accommodate rotation of the user control portion 405. The clip 408 is fastened to liner 104 by rivets 410 at both ends, as illustrated in FIG. 6, but any appropriate fastening method can be used. The clip 408 is fastened tightly enough that friction between the clip 408 and the shaft 404 will prevent undesired and unassisted rotation of the shaft 404, but also allow for easy adjustment by the operator. In the illustrated embodiment, the user control portion 405 also includes a spool or pulley 412 mounted on shaft 404 and rotatable therewith.

In the illustrated embodiment, the wing actuator engaging portion 420 includes a sheathed cable or wire arrangement 425, such as a Bowden cable arrangement. The sheath 427 of the arrangement 425 is coupled to the liner section 104 by a clip 430. The clip 430 is fastened to liner 104 by rivets 432 at both ends, as illustrated in FIG. 6, but any appropriate fastening method can be used. The sheath 427 is also coupled to liner section 103 using a clip 434. The clip 434 is fastened to liner 103 using rivets (not shown). The sheathed cable 429 of the arrangement 425 is fixed at one end to a coupler or linkage 440, which is rotatably coupled to the wing actuator 300. The other end of the sheathed cable 429 extending from the sheath 427 is coupled to and passed around the spool 412.

As shown in FIGS. 4 and 5, a biasing mechanism 500, such as a spring, is coupled to and between the coupler 440 and a tab 212 disposed on base panel 210. Spring 500 is configured to bias the actuator 300 in an extended position as shown in FIG. 4 due to the force of the spring 500 acting on actuator 300. In an alternative embodiment, spring 500 could be coupled directly to base panel 210. In another alternative embodiment, a torsional spring could be coupled to actuator 300 to provide the biasing force.

When the actuator 300 is in the extended position as shown in FIGS. 4 and 7, the liner side of side wing sections 185 is supported by inside segments 340 of wing support sections 360 of actuator 300. In this configuration, the wing support sections 360 are prevented from pivoting further downwardly by the engagement of lever 310 with the back of base panel 210 and are biased into this position by spring 500. In the illustrated embodiment, the wing support extensions are pivoted downward approximately 110° from the base panel 210 in the extended position. Since this angle is greater than 90°, a lateral force on wing support section 360, as indicated by arrow B, along with the spring bias of spring 500, will tend to keep actuator 300 in the extended position (rather than urging the wing support section 360 up into the retracted position). This configuration provides for a narrower seat back for use by younger children or infants.

In order to transition the adjustable seat back from the narrow to the wide configuration, the operator need only turn handle 402 to begin winding the sheathed cable 429 up on the spool 412. As the sheathed cable 429 is wound onto the spool 412, the sheathed cable 429 through the connector 440 begins to pull against the biasing force of the spring 500. As the operator continues to rotate the handle 402, the sheathed cable 429 acting against the biasing force of spring 500 causes the lever 310 to rotate in the direction of arrow "A" in FIG. 4 from its vertical position adjacent base panel 210 to its extended position. This in turn will pivot wing support sections 360 to the retracted position substantially vertical and adjacent base panel 210. Thus, wing sections 185 will no longer be supported by wing support sections 360. When a force is applied (such as by a child sitting in the seat) to wing sections 185 urging them toward the liner 100, wing sections 185 will pivot towards the liner 100 to become coplanar with center back section 180. Wing sections 185 are not, however, retracted to the wide configuration by the actuation of the actuator 300, but return there as a result of some other force which could be the weight of the child, manually pushing the side sections rearward, or by the urging of hinges 183 toward the coplanar state. Alternatively, the wing sections 185 could be coupled to the wing support sections 185, for example, using hook and loop fasteners, such that the wing sections 185 are retracted to the wide configuration by the actuation of the actuator 300.

In order to transition the adjustable seat back from the wide to the narrow configuration, the operator need only turn handle 402 to begin unwinding the sheathed cable 429 from the spool 412. As the sheathed cable 429 is unwound from the spool 412, the biasing force of the spring 500 pulls against the actuator 300 and causes the spring 500 to pull the lever 310 causing the lever 310 to pivot from its extended position (as shown in FIG. 5) to its vertical position parallel to base panel 210 (as shown in FIG. 4). At the initial moment of actuation of the lever 310, end support segments 365 contact the liner side of wing sections 185 urging them to pivot away from base panel 210, inside support segments 340 become flush with the liner sides of wing sections 185 urging them outward in pivotal directions about vertical axes through hinges 183 until the actuator 300 is stopped in the desired position by the user.

In the illustrated embodiment, the user can adjust the seat back at any position along the range of motion between the full, extended position and-the full, retracted position by simply ceasing rotation of the handle 402 at the desired position. Once the desired position is selected, the friction between the shaft 404 and the clip 408 will counter the biasing force of the spring 500 so that the seat back will be maintained in the desired position. Alternatively, a mechanism, such as a spring, could be coupled to either the shaft 404 or one end of the sheathed cable 429, to offset the biasing force of the spring 500.

Figure 8:
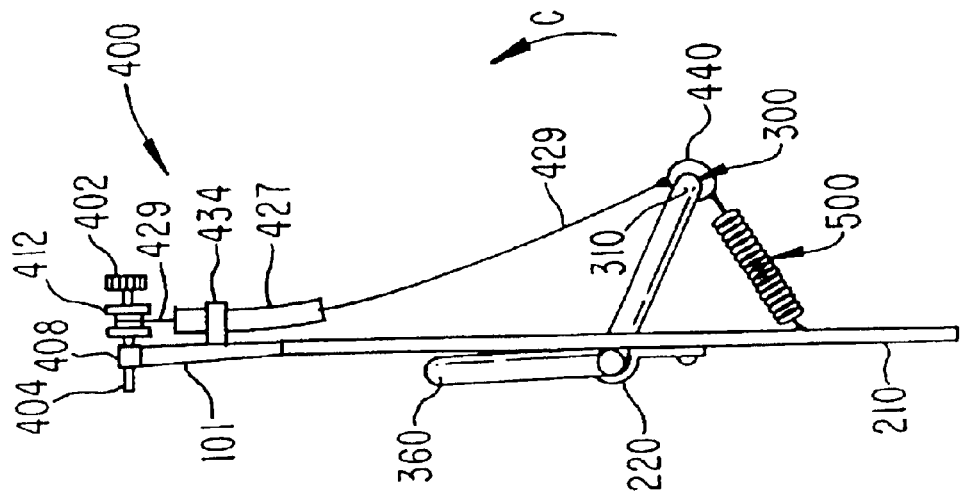
FIG. 8 is a side view of an alternative embodiment of the adjuster of FIGS. 4 and 5.
Figure 9:
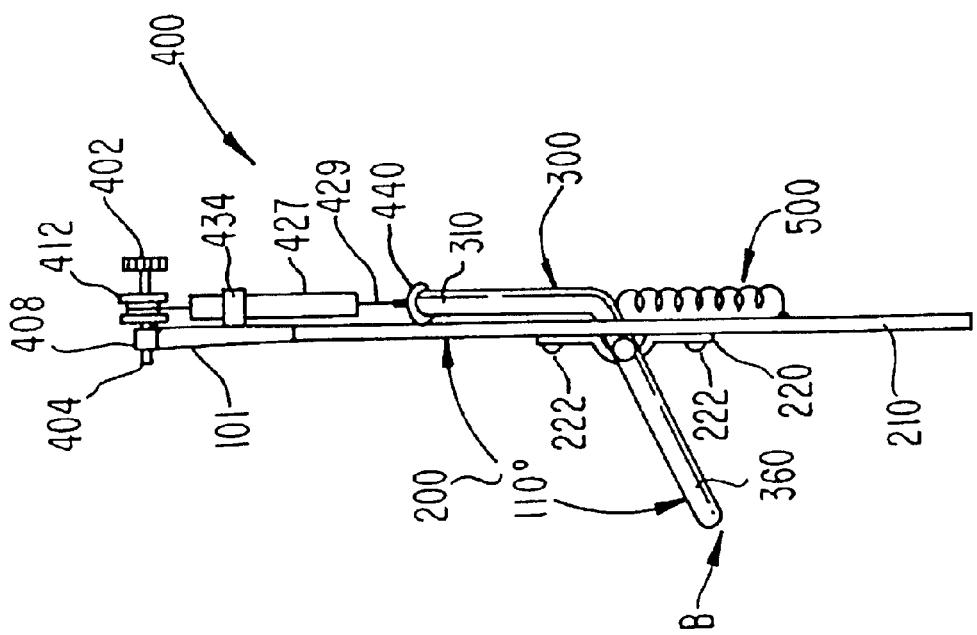
FIG. 9 is a side view of the adjuster of FIG. 8 with the wing adjustment assembly in the retracted position.

An alternative embodiment of the adjuster shown and described above with respect to FIGS. 4–6 is illustrated in FIGS. 8 and 9. FIGS. 8 and 9 also illustrate the operative engagement of the adjuster. In the illustrated embodiment, the handle 402 is affixed to the rotatable shaft 404, which is rotatably mounted to liner section 101. The shaft 404 is coupled in place on liner section 101 by the clip 408. The clip 408 is fastened to liner 101 as described above.

In the illustrated embodiment, the sheath 427 of the cable arrangement 425 is coupled to the liner section 101 by a clip 434. The clip 434 is fastened to liner 101 using rivets as described above. The sheathed cable 429 is fixed to the coupler 440 and spool 412 as described above.

As shown in FIGS. 8 and 9, the spring 500 is coupled to and between the coupler 440 and the base panel 210. However, in this embodiment, spring 500 is configured to bias the actuator 300 in the retracted position as shown in FIG. 9 due to the force of the spring 500 acting on actuator 300.

In order to transition the adjustable seat back from the wide to the narrow configuration, the operator need only turn handle 402 to begin winding the sheathed cable 429 up on the spool 412. As the sheathed cable 429 is wound onto the spool 412, the sheathed cable 429 acting through the connector 440 begins to pull against the biasing force of the spring 500. As the operator continues to rotate the handle 402, the sheathed cable 429 acting against the biasing force of spring 500 causes the lever 310 to rotate in the direction of arrow "C" in FIG. 9 from its extended position (as shown in FIG. 9) to its retracted position adjacent base panel 210 (as shown in FIG. 8). At the initial moment of actuation of the lever 310, end support segments 365 contact the liner side of wing sections 185 urging them to pivot away from base panel 210, inside support segments 340 become flush with the liner sides of wing sections 185 urging them outward in pivotal directions about vertical axes through hinges 183 until the actuator 300 is stopped in the desired position by the user.

In order to transition the adjustable seat back from the narrow to the wide configuration, the operator need only turn handle 402 to begin unwinding the sheathed cable 429 from the spool 412. As the sheathed cable 429 is unwound from the spool 412, the biasing force of the spring 500 pulls against the actuator 300 and causes the spring 500 to pull the lever 310 causing the lever 310 to pivot from its retracted position (as shown in FIG. 8) to its extended position (as shown in FIG. 9). This in turn will pivot wing support sections 360 to the retracted position substantially vertical and adjacent base panel 210 and therefore, the wing sections 185 will no longer be supported by wing support sections 360, as described above. As described above, the user can adjust the seat back at any position along the range of motion between the full, extended position and the full, retracted position by simply ceasing rotation of the handle 402 at the desired position.

Figure 10:
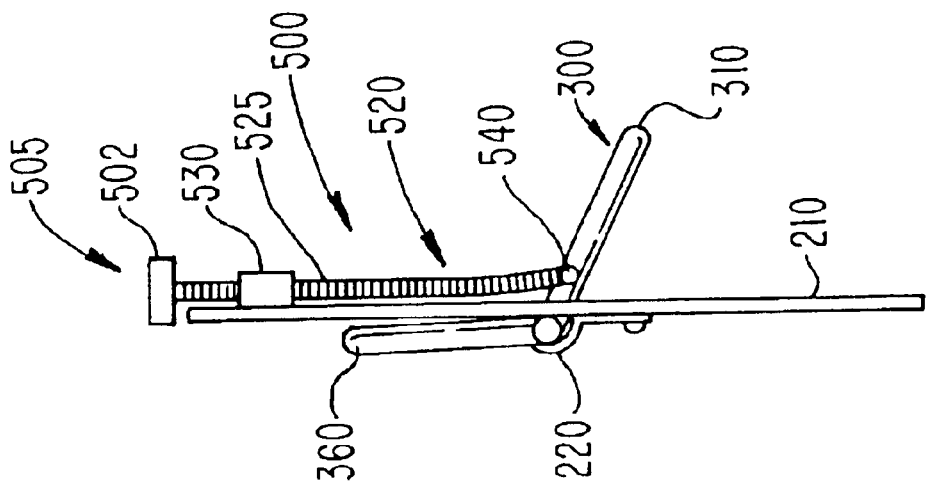
FIG. 10 is a side view of an alternative embodiment of an adjuster and wing adjustment assembly embodying the principles of the invention showing the wing adjustment assembly in the extended position.
Figure 11:
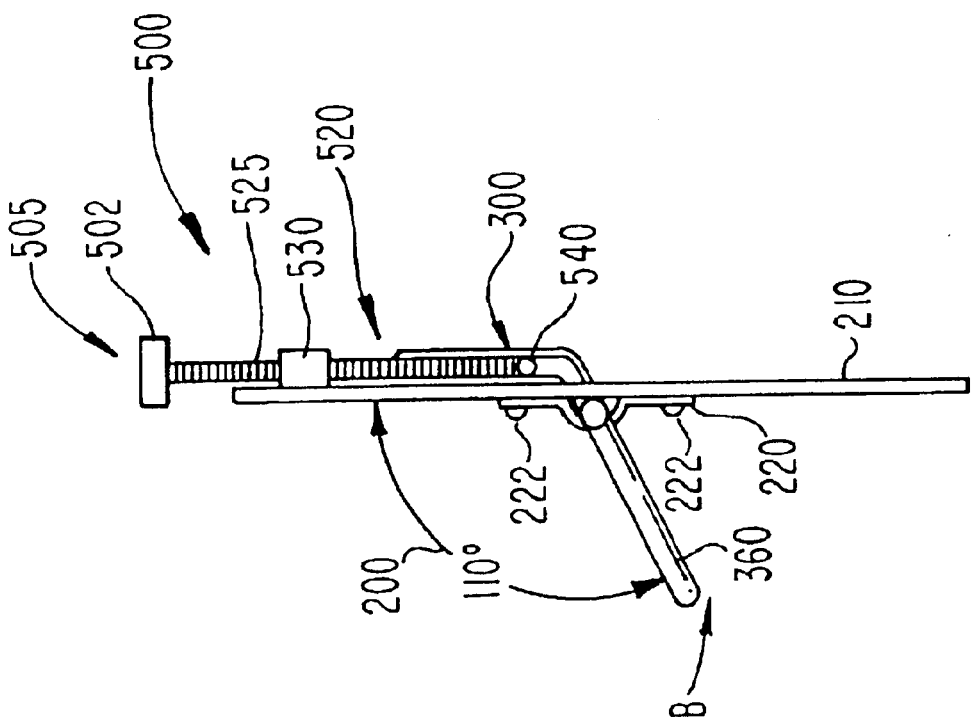
FIG. 11 is a side view of the adjuster and wing assembly of FIG. 10 with the wing adjustment assembly in the retracted position.

A further alternative of an adjuster embodying the principles of the invention is shown in FIGS. 10 and 11. FIGS. 10 and 11 also illustrate the operative engagement of the adjuster. In the illustrated embodiment, an adjuster or adjustment mechanism 500 includes a user control portion 505 and a wing actuator engaging portion 520. The user control portion 505 includes a handle 502. The wing actuator engaging portion 520 includes a cable 525. The cable 525 is slidably coupled to the base panel 210 by a clip 530 of the type described above. The clip 530 is fastened tightly enough that friction between the clip 530 and the cable 525 will prevent undesired and unassisted movement of the cable 525 within the clip 530, but also allow for easy adjustment by the operator. The cable 525 is fixed at one end to a coupler or linkage 540, which is rotatably coupled to the wing actuator 300. The other end of the cable 525 is coupled to the handle 502. The cable 525 can be formed with a protective sheath if desired. In an alternative embodiment, a threaded shaft or rod could be substituted for cable 525. The threaded rod is coupled to the base panel 210 in a well-known manner.

In order to transition the adjustable seat back from the narrow configuration to the wide configuration, the operator need only grasp handle 502 and push the cable 525 to the desired position. Alternatively, if a threaded rod were employed, the rod would be rotated clockwise or counter-clockwise to move the wing actuator to the desired position. As the cable 525 is pushed through the entire range of motion, the linkage provided by the coupler 540 causes the lever 310 to pivot from its vertical position adjacent base panel 210 (as shown in FIG. 10) to its extended position (as shown in FIG. 11). This in turn will pivot wing support sections 360 to the retracted position substantially vertical and adjacent base panel 210. Thus, wing sections 185 will no longer be supported by wing support sections 360. When a force is applied (such as by a child sitting in the seat) to wing sections 185 urging them toward the liner 100, wing sections 185 will pivot towards the liner 100 to become coplanar with center back section 180. Alternatively, the wing sections 185 could be coupled to the wing support sections 185, for example, using hook and loop fasteners, such that the wing sections 185 are retracted to the wide configuration by the actuation of the actuator 300.

The cable 525 should be formed of a material which has sufficient strength to withstand the compressive forces required for rotating the lever without buckling while at the same time providing sufficient flexibility so that the lever can be rotated throughout the full range of motion. In the illustrated embodiment, the cable 525 is made from steel. It should be apparent to the skilled artisan that other suitable materials could also be employed.

In order to transition the adjustable seat back from the wide to the narrow configuration, the operator need only grasp handle 502 and pull the cable 525 to the desired position. As the cable 525 is pulled through the entire range of motion, the linkage provided by the coupler 540 causes the lever 310 to pivot from its extended position (as shown in FIG. 11) to its vertical position parallel to base panel 210 (as shown in FIG. 10). At the initial moment of actuation of the lever 310, end support segments 365 contact the liner side of wing sections 185 urging them to pivot away from base panel 210, inside support segments 340 become flush with the liner sides of wing sections 185 urging them outward in pivotal directions about vertical axes through hinges 183 until the actuator 300 is stopped in the desired position by the user.

In the illustrated embodiment, the user can adjust the seat back at any position along the range of motion between the full, extended position and the full, retracted position by simply ceasing pushing or pulling on the cable 525 at the desired position. Once the desired position is selected, the friction between the cable 525 and the clip 530 maintains the seat back in the desired position.

Figure 12:
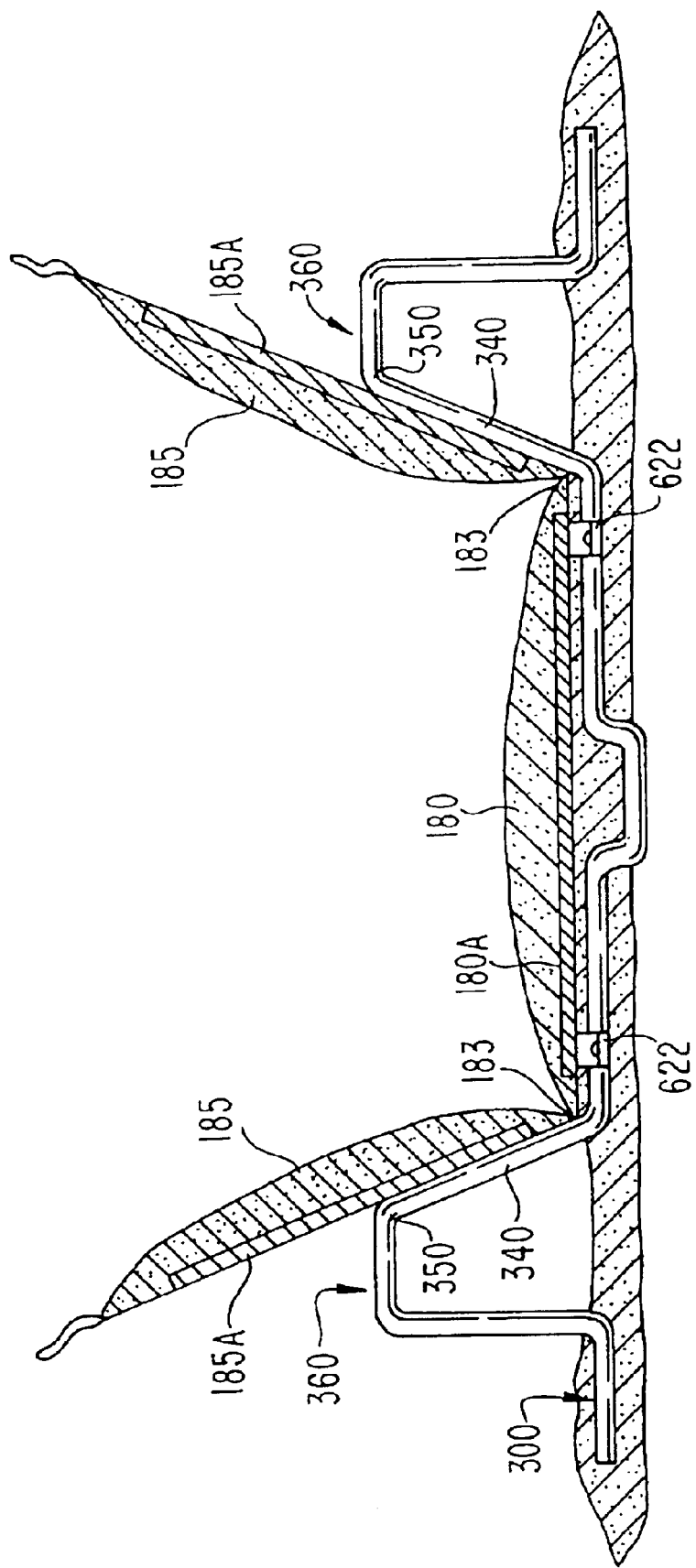
FIG. 12 is a cross-sectional view of an alternative coupling arrangement between the wing adjustment assembly and the seat liner embodying the principles of the invention.

An alternative embodiment of a coupling arrangement between the wing adjustment assembly and the seat liner embodying the principles of the invention is illustrated in FIG. 12. In the illustrated embodiment, actuator 300 is coupled directly to the back side of the rigid base panel 180A of the center back section 180 using clips 622 of the type described above. In another alternative embodiment, the actuator 300 could be coupled directly to the back side of the liner section 102. In each of the embodiments, the need for the separate base panel 210 is eliminated. Otherwise, the functionality of the actuator 300 and the adjuster is similar to that described above.

Figure 13:
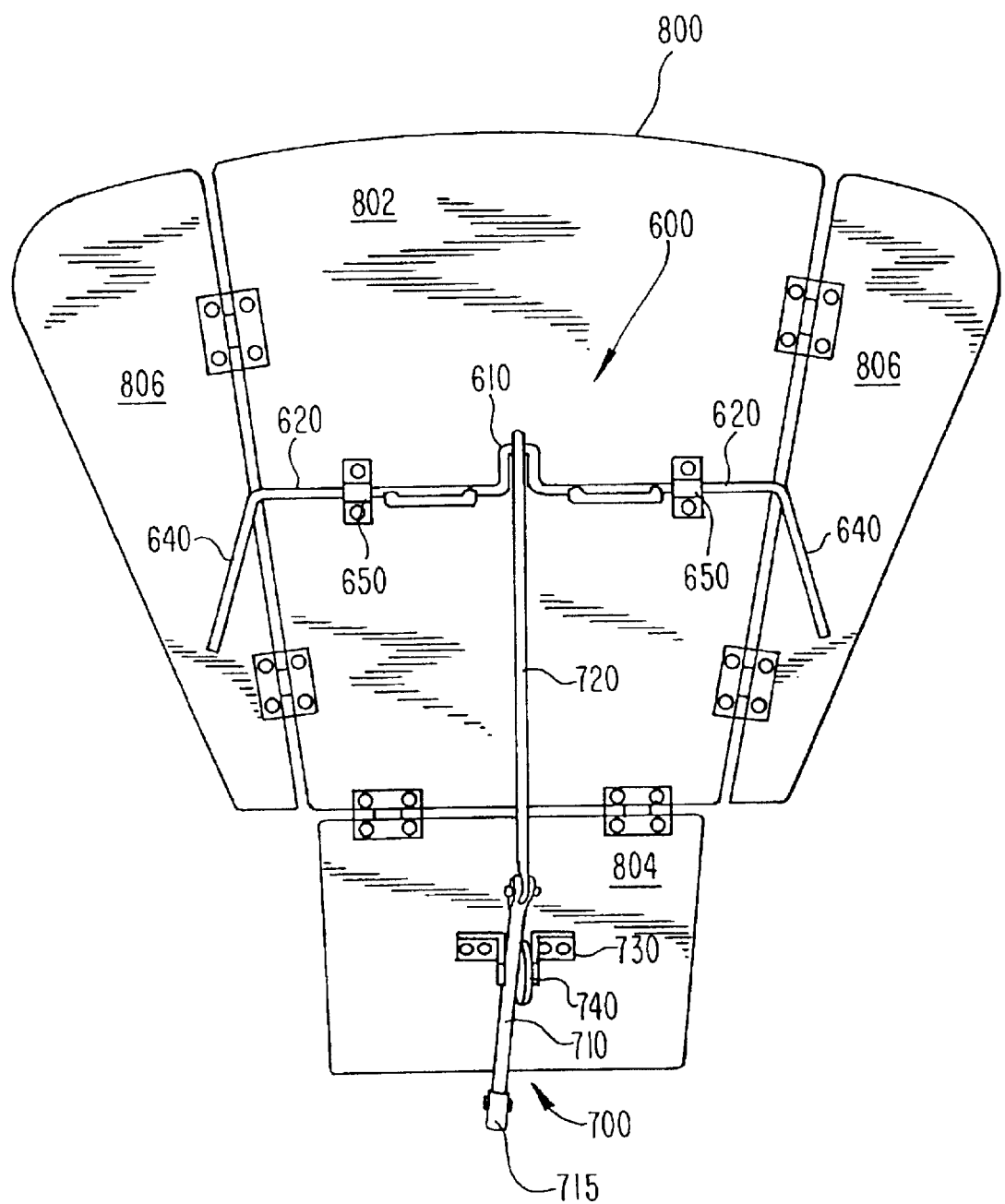
FIG. 13 is a side view of an alternative embodiment of an adjuster and wing adjustment assembly embodying the principles of the invention showing the wing adjustment assembly in the retracted position.
Figure 14:
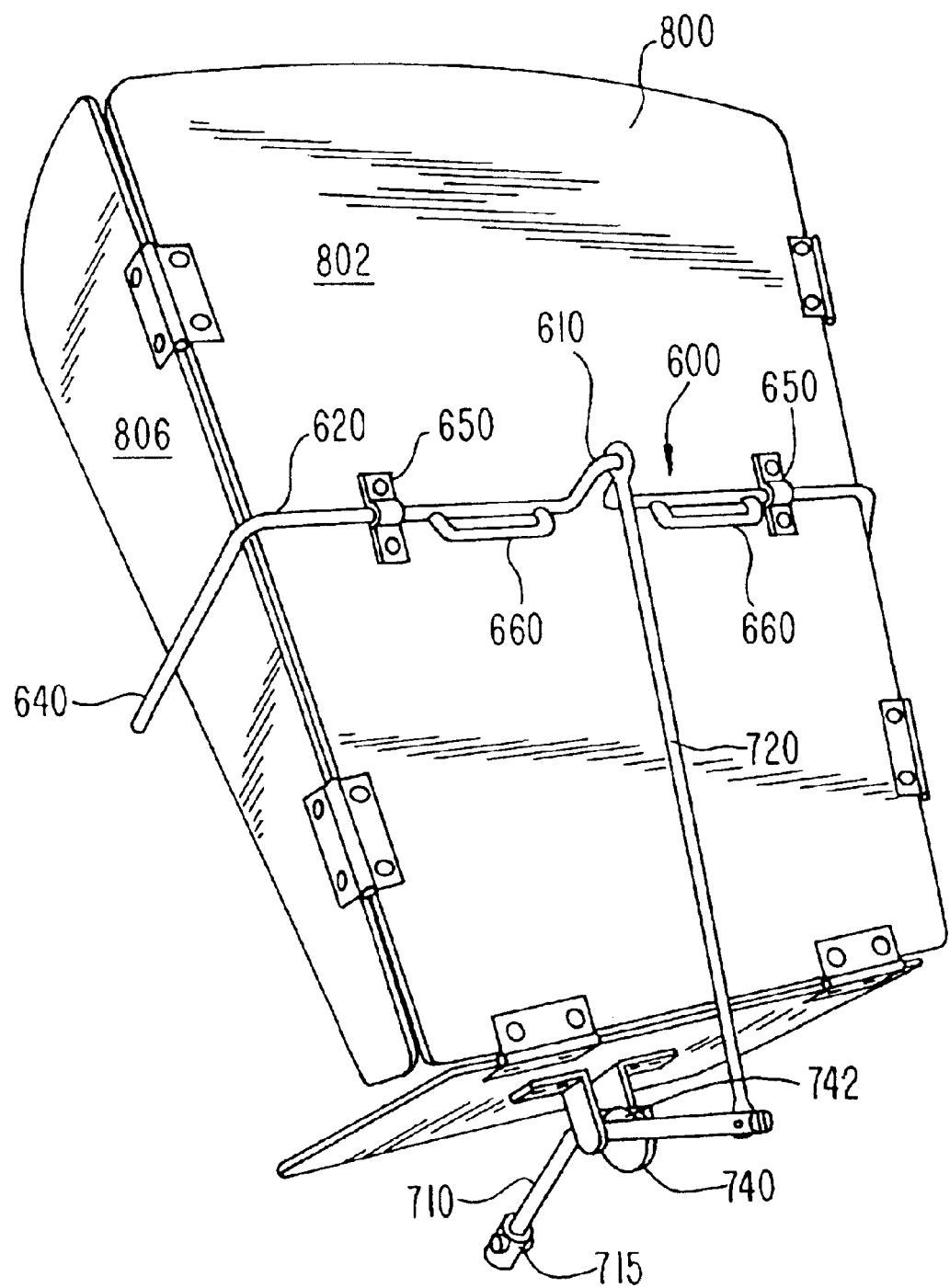
FIG. 14 is a perspective view of the adjuster and wing assembly of FIG. 13 with the wing adjustment assembly in the extended position.

Alternative embodiments of the wing actuator 600 and adjuster 700 are illustrated in FIGS. 13 and 14. FIGS. 13 and 14 also illustrate the operative engagement of the adjuster 700 and wing actuator 600. As shown in FIG. 13, the wing actuator 600 includes a lever section 610, pivot sections 620, and wing support sections 640. As shown in FIGS. 13 and 14, wing actuator 600 is preferably rotatably mounted to the central body of seat liner 800, and particularly, to seat liner section 802 using a pair of clips 650 of the type discussed above.

Adjuster 700 includes a user control portion 710 and a wing actuator engaging portion 720. As illustrated, the user control portion 710 includes a handle 715 affixed to one end of the user control portion 710. User control portion 710 is preferably rotatably mounted to the underside or bottom of seat liner section 804 using a mounting bracket 730. A retaining mechanism 740, which is used for retaining the user control portion 710 in one of two positions, such as a disc, or the like, is also coupled to the mounting bracket 730 and the user control portion 710. User control portion 710 is rotatably coupled at one end to the wing actuator engaging portion 720, using a pin or other known fastening device. In the embodiment shown in FIGS. 13 and 14, wing actuator engaging portion 720 is a solid rod, which is rotatably coupled at one end to the lever section 610 of wing actuator 600 and at the other end to the user control portion 710 of the adjuster 700.

When the wing actuator 600 is in the extended position as shown in FIG. 14, the wing sections 806 of the seat liner 800 are supported by the wing support sections 640 of wing actuator 600. In this configuration, the wing support sections 640 are prevented from pivoting by the engagement of the two liner support sections 660 with the back of seat liner section 802. In addition, the retaining mechanism 740, through frictional or mechanical engagement with the user control portion 710 of the adjuster 700 maintains the wing actuator 600 in the extended position.

In order to transition the adjustable seat back from the narrow to the wide configuration (i.e., from the position shown in FIG. 14 to the position shown in FIG. 13), the operator need only rotate handle 715 in the manner described above. The user control portion 710 would disengage from the retaining mechanism 740 which would cause the wing actuator engaging portion 720 to move upwardly thereby causing the lever section 610 of the wing actuator 600 to move upwardly. This, in turn, causes the wing support sections 640 to rotate until they are substantially parallel to the liner section 802.

In order to transition the adjustable seat back from the wide to the narrow configuration (i.e., from the position shown in FIG. 13 to the position shown in FIG. 14), the operator rotates the handle 715, which causes the user control portion 710 to engage the retaining mechanism 740. At the same time, the wing actuator engaging portion 720 moves downwardly causing the lever section 610 of the wing actuator 600 to move downwardly. This, in turn, causes the wing support sections 640 to rotate outwardly until they are substantially perpendicular to the liner section 802.

It should be apparent to one of skill in the art, that any number of well known retaining mechanisms may be employed to retain the user control portion 710 in one of the two positions as described above. One example is shown in FIGS. 13 and 14. In FIGS. 13 and 14, retaining mechanism 746 includes a disc having a portion 742, which engages user control portion 710 in a frictional engagement such that user control portion 710 is maintained in the position shown in FIG. 14. In order to disengage the user control portion 710 from retaining mechanism 740, the user would simply rotate the handle of user control portion 715 such that the user control portion 710 is disengaged from the retaining mechanism 740 as described above. In another embodiment (not shown), the retaining mechanism 740 could include a notch or the like which would releasably mechanically and frictionally engage a portion of the user control portion 710. In order to disengage the user control portion 710, the user would simply rotate the handle 715 to disengage the user control portion 710 from the corresponding notch.

Although the exemplary embodiments have been illustrated as embodied on a child support structure, such as a stroller, various other configurations are possible and may include other structures, such as high chairs, wheel chairs, swings, and the like.

Moreover, although the above-described embodiments disclose two movable side sections, this invention could also be used with one movable side section and one fixed side section. Further, the actuator 300 could be a molded piece of plastic incorporating projecting wing support sections and an operating lever and mounted for pivotal movement.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. A seat back adjustable by an operator to accommodate an occupant, comprising:
   a seat liner having:
      a center back section, and
      a side wing section, said side wing section being coupled to said center back section for pivotal movement through a range of motion between a first, wide position in which said side wing section is disposed at a first angle with respect to said center back section, and a second, narrow position in which said side wing section is rotated toward said center back section and disposed at a second angle with respect to said center back section;
   a wing actuator disposed behind said seat liner, said wing actuator having a longitudinal axis and including a lever section and a wing support section, said wing actuator being disposed with respect to said seat liner with said longitudinal axis being substantially parallel to and behind said center back section and said wing support section being disposed behind said side wing section, said wing actuator being mounted for pivotal movement about said longitudinal axis through a range of motion between a first, retracted position in which said wing support section engages said side wing section in said first, wide position, and a second, extended position in which said wing support section engages said side wing section in said second, narrow position; and
   an adjuster having:
      a user control portion,
      a wing actuator engaging portion coupled to said user control portion and said wing actuator, said wing actuator engaging portion configured to move said wing actuator through said range of motion between said first, retracted position and said second, extended position, and
      a biasing mechanism coupled to said wing actuator and configured to bias said wing actuator toward one of said first, retracted position and said second, extended position.

2. The adjustable seat back of claim 1, wherein said biasing mechanism is further coupled to said seat liner.

3. An adjustable seat back, comprising:
   a seat pad having:
      a center back section, and
      a side wing section, each of said center back section and said side wing section having a front face to support the occupant and an opposite, rear face, said side wing section being coupled to said center back section for pivotal movement through a range of motion between a first, wide position in which said front face of said side wing section is disposed at a first angle with respect to said center back section, and a second, narrow position in which said front face of said side wing section is rotated toward said front face of said center back section and disposed at a second angle with respect to said center back section;
   a wing actuator assembly disposed behind said seat pad and having:
      a substantially planar base panel having an aperture formed therethrough, and
      a wing actuator disposed on said base panel and having a longitudinal axis, said wing actuator including a lever section and a wing support section, and being disposed on said base panel with said longitudinal axis being substantially parallel to said base panel, said wing support section being between said base panel and said side wing section, and said lever section extending through said aperture, said wing actuator being disposed on said base panel for pivotal movement about said longitudinal axis through a range of motion between a first, retracted position in which said wing support section engages said rear face of said side wing section in said first, wide position, and a second, extended position in which said wing support section engages said rear face of said side wing section in said second, narrow position; and
   an adjuster having:
      a user control portion, and
      a wing actuator engaging portion coupled to said user control portion and said wing actuator, said wing actuator engaging portion configured to move said wing actuator through said range of motion between said first, retracted position and said second, extended position.

4. The adjustable seat back of claim 3, wherein said seat pad includes a second side wing section having a front face to support the occupant and an opposite, rear face, said second side wing section being coupled to said center back section opposite said side wing section, for pivotal movement through a range of motion between a first, wide position in which said second side wing section is substantially coplanar with said center back section, and a second, narrow position in which said front face of said second side wing section is rotated toward said front face of said center back section; and
   said wing actuator includes a second wing support section disposed between said base panel and said second side wing section, said second wing support section extending from said base panel to engage said rear face of said second side wing section and urge said second side wing section into said narrow position when said wing actuator is in said extended position, and said second wing support section is disposed substantially parallel to said front face of said base panel when said wing actuator is in said retracted position.

5. The adjustable seat back of claim 4, wherein said side wing section and said second side wing section are symmetrically arranged about said center back section, and said wing support section and said second wing support section are symmetrically disposed about said lever section.

6. The adjustable seat back of claim 3, wherein said wing actuator is formed of wire rod.

7. The adjustable seat back of claim 3, further comprising:
   a seat liner disposed behind said seat pad and housing said base panel and said wing actuator, said seat liner including slots formed therethrough through which said wing support section and said lever section extend.

8. The adjustable seat back of claim 3, wherein said lever section is disposed substantially parallel to, and in engagement with, said base panel, when said wing actuator is in said extended position.

9. The adjustable seat back of claim 3, further comprising:
a biasing mechanism coupled to said wing actuator and configured to bias said wing actuator toward one of said first, retracted position and said second, extended position.

10. The adjustable seat back of claim 9, wherein said biasing mechanism is coupled to said base panel.

11. The adjustable seat back of claim 3, wherein said wing actuator engaging portion includes a cable having a first end and a second end, said first end coupled to said wing actuator.

12. The adjustable seat back of claim 11, wherein said user control portion includes a handle coupled to said second end of said cable.

13. The adjustable seat back of claim 12, wherein said user control portion includes a rotatable spool coupled to said handle and said second end of said cable, said spool configured so that said cable can be wrapped about said spool.

14. The adjustable seat back of claim 3, wherein said wing actuator engaging portion includes a rod having a first end and a second end, said first end coupled to said user control portion and said second end coupled to said wing actuator.

15. A control assembly for adjusting a seat back wing actuator, the wing actuator having a longitudinal axis and including a lever section and a seat back wing support section mounted for pivotal movement about the longitudinal axis through a range of motion between a first, retracted position and a second, extended position, said control assembly comprising:
a user control portion;
a wing actuator engaging portion having a first end couplable to said user control portion and a second end coupled to the wing actuator, said wing actuator engaging portion configured to move the wing actuator through the range of motion between the first, retracted position and the second, extended position; and
a biasing mechanism coupled to said wing actuator and configured to bias said wing actuator toward one of said first, retracted position and second, extended position.

16. A seat back adjustable by an operator to accommodate an occupant, comprising:
a seat liner having:
a center back section, and
a side wing section, said side wing section being coupled to said center back section for pivotal movement through a range of motion between a first, wide position in which said side wing section is disposed at a first angle with respect to said center back section, and a second, narrow position in which said side wing section is rotated toward said center back section and disposed at a second angle with respect to said center back section;
a wing actuator disposed behind said seat liner, said wing actuator having a longitudinal axis and including a lever section and a wing support section, said wing actuator being disposed with respect to said seat liner with said longitudinal axis being substantially parallel to and behind said center back section and said wing support section being disposed behind said side wing section, said wing actuator being mounted for pivoted movement about said longitudinal axis through a range of motion between a first, retracted position in which said wing support section engages said side wing section in said first, wide position and a second, extended position in which said wing support section engages said side wing section in said second, narrow position; and
an adjuster having;
a user control portion, and
a wing actuator engaging portion coupled to said user control portion and said wing actuator, said wing actuator engaging portion configured to move said wing actuator through said range of motion between said first, retracted position and said second, extended position, said wing actuator engaging portion including a cable having a first end and a second end, said first end coupled to said wing actuator.

17. The adjustable seat back of claim 16, wherein said user control portion includes a handle coupled to said second end of said cable.

18. The adjustable seat back of claim 17, wherein said user control portion includes a rotatable spool coupled to said handle and said second end of said cable, said spool configured so that said cable can be wrapped about said spool.

* * * * *